US010996675B1

(12) United States Patent
Yaqub

(10) Patent No.: US 10,996,675 B1
(45) Date of Patent: May 4, 2021

(54) USE OF FINANCIAL SERVICE SYSTEMS DURING OR AFTER AN OUTAGE

(71) Applicant: Wells Fargo Bank, N.A., San Francisco, CA (US)

(72) Inventor: Raziq Yaqub, Stewartsville, NJ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 320 days.

(21) Appl. No.: 15/667,409

(22) Filed: Aug. 2, 2017

(51) Int. Cl.
| | | |
|---|---|---|
| *G06Q 20/32* | (2012.01) | |
| *G05D 1/02* | (2020.01) | |
| *G06Q 20/10* | (2012.01) | |
| *G05D 1/04* | (2006.01) | |
| *G01C 21/20* | (2006.01) | |
| *B64C 39/02* | (2006.01) | |
| *G06Q 20/40* | (2012.01) | |

(52) U.S. Cl.
CPC ......... *G05D 1/0202* (2013.01); *B64C 39/024* (2013.01); *G01C 21/20* (2013.01); *G05D 1/042* (2013.01); *G06Q 20/1085* (2013.01); *B64C 2201/12* (2013.01); *G06Q 20/325* (2013.01); *G06Q 20/4014* (2013.01)

(58) Field of Classification Search
None
See application file for complete search history.

(56) References Cited

U.S. PATENT DOCUMENTS

| 6,018,659 A * | 1/2000 | Ayyagari ........... H04B 7/18504 |
| | | 342/450 |
| 8,423,465 B1 | 4/2013 | McGraw, IV et al. |
| 8,548,911 B2 * | 10/2013 | Dent ...................... G06Q 40/02 |
| | | 705/26.41 |
| 9,185,639 B1 | 11/2015 | Sherman et al. |

(Continued)

FOREIGN PATENT DOCUMENTS

| CN | 103051373 A | 4/2013 |
| KR | 101661861 B1 | 9/2016 |

OTHER PUBLICATIONS

Day., "AT&T bets drones will be your new cellphone friend," The Seattle Times, Sep. 2016, 3 pp.

(Continued)

*Primary Examiner* — Arunava Chakravarti
(74) *Attorney, Agent, or Firm* — Shumaker & Sieffert, P.A.

(57) ABSTRACT

This disclosure describes techniques for identifying and reconnecting systems, including financial service systems, to a network during or after an outage in which systems have been disconnected from one or more networks. In one example, this disclosure describes a method that includes navigating a vehicle, by a computing system of the vehicle, to a location near an area in which one or more financial service systems have been disconnected from a network; identifying, by the computing system of the vehicle and based on a wireless signal detected by the vehicle, a financial service system that is within the area and that has been (Continued)

disconnected from the network, wherein the financial service system is one of the one or more financial service systems; and transferring, by the computing system of the vehicle, information between the financial service system and a banking computing system to thereby enable performance of a financial transaction.

22 Claims, 5 Drawing Sheets

(56) References Cited

U.S. PATENT DOCUMENTS

| | | | | |
|---|---|---|---|---|
| 9,363,008 | B2* | 6/2016 | Boss | H04W 84/06 |
| 9,389,967 | B2 | 7/2016 | Dent | |
| 9,505,494 | B1* | 11/2016 | Marlow | B64C 39/024 |
| 9,654,200 | B2* | 5/2017 | Mazzarella | H04W 4/90 |
| 2004/0149819 | A1* | 8/2004 | Shepley | G07F 19/21 |
| | | | | 235/379 |
| 2008/0074496 | A1* | 3/2008 | Venetianer | G06K 9/00335 |
| | | | | 348/150 |
| 2008/0273754 | A1* | 11/2008 | Hick | G06K 9/00771 |
| | | | | 382/103 |
| 2011/0130636 | A1 | 6/2011 | Daniel et al. | |
| 2014/0012753 | A1* | 1/2014 | Fuentes | G06Q 40/02 |
| | | | | 705/43 |
| 2016/0360562 | A1* | 12/2016 | Chong | H04W 4/025 |

OTHER PUBLICATIONS

Erdelj et al., "UAV-assisted diaster management: Applications and open issues," HAL Archives-Ouvertes, Apr. 21, 2016, 6 pp.

Kalantari et al., "On the Number and 3D Placement of Drone Base Stations in Wireless Cellular Networks," Sep. 18-21, 2016, 6 pp.

Miyakawa et al., "How Natural Disasters Affect Banking," World Economic Forum, Aug. 15, 2014, 8 pp.

Mozaffari et al., "Drone Small Cells in the Clouds: Design, Deployment and Performance Analysis," Sep. 5, 2015, 6 pp.

* cited by examiner

USE OF FINANCIAL SERVICE SYSTEMS DURING OR AFTER AN OUTAGE

TECHNICAL FIELD

This disclosure relates to computer networks, and more specifically, to recovering connectivity and/or reconnecting systems during or after an outage.

BACKGROUND

Damage resulting from events such earthquakes, tornados, and hurricanes, or resulting from other events such as terrorism, can affect critical infrastructure services, such as communications (e.g., internet and telecom), electrical power, water, and other services. As a result of such damage, connectivity-dependent and/or mechanized financial services may be adversely affected, including services provided by financial service systems such as automated teller machines ("ATMs") and point-of-sale systems.

SUMMARY

This disclosure describes techniques for identifying and reconnecting systems, including financial service systems, to one or more networks during or after an outage in which such systems have been disconnected from one or more networks. Techniques in accordance with aspects of the present disclosure may enable financial service or infrastructure systems, such as ATMs and point-of-sale devices, to operate when usual or normal connectivity options are not available. As described in one or more examples, the techniques may involve navigating an unmanned vehicle, such as an aerial drone, to a location near an area affected by an outage. The unmanned vehicle may identify one or more systems that have lost connectivity, provide connectivity to such systems, and enable communications and/or transactions to be performed using connectivity provided by the unmanned vehicle. The unmanned vehicle may also output information that can be used to generate informational user interfaces, and/or to assist utility or other providers in restoring services.

In one example, this disclosure describes a method comprising navigating a vehicle, by a computing system of the vehicle, to a location near an area in which one or more financial service systems have been disconnected from a network; identifying, by the computing system of the vehicle and based on a wireless signal detected by the vehicle, a financial service system that is within the area and is capable of communicating with the vehicle, wherein the financial service system is one of the one or more financial service systems; establishing, by the computing system of the vehicle, communications with the financial service system; and transferring, by the computing system of the vehicle, information between the financial service system and a banking computing system to enable completion of a financial transaction initiated at the financial service system.

In another example, this disclosure describes a computing system of a vehicle comprising: a storage device; and processing circuitry having access to the storage device and configured to: navigate the vehicle to a location near an area in which one or more financial service systems have been disconnected from a network, identify, based on a wireless signal detected by the vehicle, a financial service system that is within the area and is capable of communicating with the vehicle, wherein the financial service system is one of the one or more financial service systems, establish communications with the financial service system, and transfer information between the financial service system and a banking computing system to enable completion of a financial transaction initiated at the financial service system.

In another example, this disclosure describes a computer-readable storage medium comprises instructions that, when executed, configure processing circuitry of a computing system of a vehicle to: navigate the vehicle to a location near an area in which one or more financial service systems have been disconnected from a network; identify, based on a wireless signal detected by the vehicle, a financial service system that is within the area and is capable of communicating with the vehicle, wherein the financial service system is one of the one or more financial service systems; establish communications with the financial service system; and transfer information between the financial service system and a banking computing system to enable completion of a financial transaction initiated at the financial service system.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
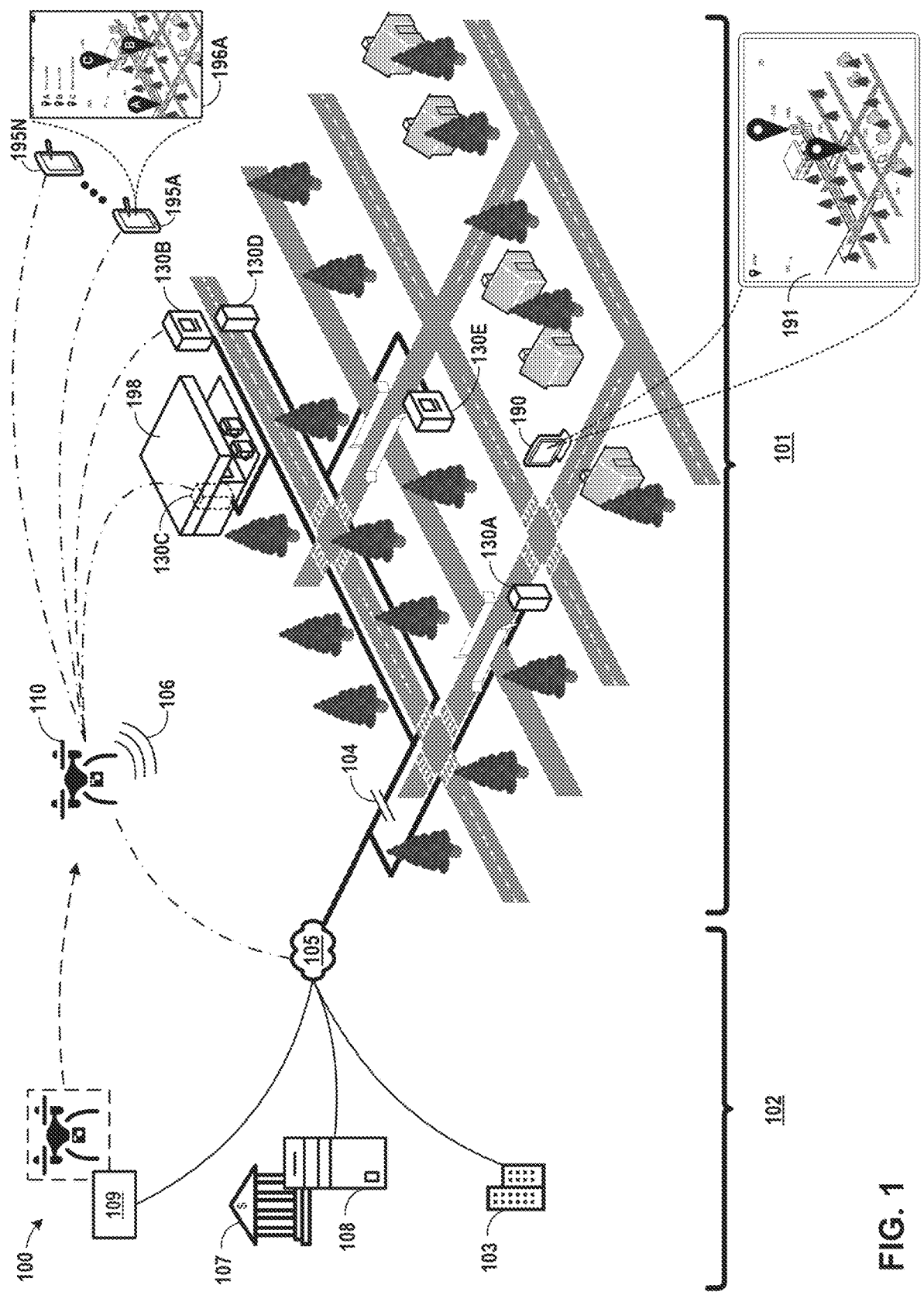
FIG. 1 is a conceptual diagram illustrating an example geographical area that is affected by a power, communications, utility, and/or other type of outage, and in which one or more financial infrastructure systems and/or financial service systems are deployed, in accordance with one or more aspects of the present disclosure.

FIG. 1 is a conceptual diagram illustrating an example geographical area that is affected by a power, communications, utility, and/or other type of outage, and in which one or more financial infrastructure systems and/or financial service systems are deployed, in accordance with one or more aspects of the present disclosure. The example of FIG. 1 illustrates affected area 101 and unaffected area 102. System 100 spans affected area 101 and unaffected area 102. Affected area 101 includes one or more financial service systems 130 connected, via network 105, to other devices and/or systems, including bank computing system 108. Financial service system 130A through financial service system 130E may be referred to herein as "financial service systems 130." Although only financial service system 130A through financial service system 130E are illustrated in FIG. 1, "financial service systems 130" may refer to any number of financial service systems. Each of financial service systems 130 may represent any of a variety of different types of financial infrastructure systems or devices. For instance, one or more of financial service systems 130 may be or include an automated teller machine ("ATM"), a point of sale device, a retail check-out terminal, a credit card processor, a financial information kiosk, or any other similar or related device.

In recent years, hundreds of natural disasters worldwide have affected millions of people and have caused significant damage. An upward trend may be expected to continue as a result of the rising concentration of people living in areas more exposed to natural disasters, and as a result of climate change. Because society is heavily dependent on critical infrastructure such as power and communication systems, events that cause disruptions to power and/or communications may exacerbate the negative effects of the event. For example, in addition to the many other negative effects resulting from a disaster (collapsed buildings, medical emergencies), critical financial resources may become inaccessible, depriving survivors and others access to financial resources and financial services. Disruption or lack of access to services provided by ATMs and point of sale devices (used by gas stations, grocery stores, retail sales stores) can be particularly problematic after such an event. Some business might not be able to operate without connectivity, and may be entirely disabled without access to banking services. Also, individuals may seek to obtain cash after an adverse event, and ATMs often have cash to distribute, but ATMs often are not accessible or operational due to connectivity disruptions after the event. Individuals may need to purchase basic necessities (gas and food), but without access to cash or other financial services (an ability to pay using a credit card), those basic necessities might not be available.

This disclosure describes, in some examples, a system architecture and methodology to revive financial services in a timely manner in disaster-stricken area. For instance, in some examples, an airborne base station (e.g., communicating through a satellite or cellular network) may hover over an affected area. The base station may first discover those ATMs that are physically accessible, and then provide those ATMs with the wireless communication connectivity so that the ATMs are able to deliver financial services. The base station may also provide connectivity to survivors and other users within the disaster-stricken area, and send notifications to mobile devices possessed by those users about the location (e.g. addresses and/or other descriptions of location) and availability of accessible ATMs. The base station may enable the display of a map showing the location of some or all available and/or accessible ATMs on a monitor placed in a public area, such as in a disaster relief camp or gathering area, corporate website, social media websites, and broadcast media. The base station may also provide connectivity services to third party businesses that use credit cards, debit cards, and/or ATM cards to transact business. The base station may also, based on communication activity and information gathered by the base station, provide recommendations to utility companies that may be used to prioritize the service restoration in the areas having the most need.

In the example shown in FIG. 1, financial service system 130A, financial service system 130C, and financial service system 130D are point of sale terminals. Financial service system 130B and financial service system 130E are ATMs. In normal operation, one or more financial service systems 130 may perform financial transactions (e.g., ATM withdrawals or deposits, retail transactions, etc.) by communicating over network 105 with one or more bank computing systems 108 associated with one or more financial institutions 107. For instance, a user may interact with financial service system 130C to purchase fuel at gas station 198. During such an interaction, financial service system 130C may communicate with bank computing system 108 over network 105 to authorize and confirm payment. In another example, a user may interact with financial service system 130B (i.e., an ATM) to withdraw cash, and during such an interaction, financial service system 130B may communicate with bank computing system 108 over network 105 to authorize the transaction and confirm availability of funds.

One or more mobile devices 195 (mobile device 195A through mobile device 195N, which represent any number of mobile devices) may be within affected area 101 and may be operated by users residing or otherwise present within affected area 101. Each of mobile devices 195 may be capable of presenting a user interface, such as user interface 196A on mobile device 195A, as illustrated in FIG. 1. Public display system 190 may also be included within affected area 101. Public display system 190 may be capable of generating and presenting a user interface, such as user interface 191, which is presented at a user interface device as illustrated in FIG. 1.

Network 105 normally connects systems and/or devices within affected area 101 to other systems or devices within affected area 101 or outside affected area 101 (e.g., in unaffected area 102). Network 105 may connect many different devices and systems. For instance, network 105 may connect any system or device within affected area 101 (e.g., financial service systems 130 or mobile devices 195) to systems or devices within unaffected area 102 (e.g., bank computing system 108, provider computing system 103 and drone information system 109. In some examples, network 105 may represent multiple networks, such as a wireline network accessed by financial service systems 130, and a wireless network accessed by mobile devices 195.

Drone 110 may be an unmanned aerial vehicle or other device that is capable of traveling to affected area 101. In some examples, drone 110 may interact with drone information system 109 before a flight to obtain information, power, configuration, or programming. Drone 110 may, for example, be equipped to travel to the vicinity of affected area 101 and may establish and/or control drone-enabled network 106.

Although described as an aerial vehicle, drone 110 may, in other examples, be implemented as an unmanned land vehicle or unmanned water vehicle. For example, an unmanned land vehicle may be implemented as an unmanned automobile, motorcycle, armored vehicle, emergency vehicle, tank, law enforcement vehicle, or any other land-based vehicle. An unmanned water vehicle may be implemented as an unmanned speedboat, pontoon, or any other water based vehicle. Further, drone 110 may, in some examples, be implemented as a commercial jet, airliner, or any other aerial vehicle. Further, drone 110 is described herein as not having human passengers, but in other examples, drone 110 may include an area for human passengers.

In the example of FIG. 1, an outage has disabled some or all of the power, communications, and/or other services in affected area 101. In particular, as a result of some event (e.g., a natural disaster, a terrorist act, or other event) one or more of financial service systems 130 may be without power, and one or more of financial service systems 130 may be disconnected (e.g., at disconnection point 104) from network 105 as a result of infrastructure damage. Different financial service systems 130 might suffer varying degrees of damage, and some of financial service systems 130 might not be damaged at all.

For instance, in the example of FIG. 1, neither financial service system 130A nor its connection to network 105 is damaged. After the event, financial service system 130A is capable of operating normally.

On the other hand, in the example of FIG. 1, financial service system 130B has been adversely affected by the event, but only to the extent that the physical connection between financial service system 130B and network 105 has been lost at disconnection point 104. Accordingly, financial service system 130B cannot communicate over network 105, but 130B is able to communicate with other devices over networks not requiring a connection to network 105. For example, financial service system 130B may be equipped with a wireless transmitter that has not been damaged as a result of the event, so that financial service system 130B can communicate wirelessly with other devices.

Similarly, financial service system 130C, which represents a point of sale terminal within gas station 198, also is unable to connect to network 105. But in the example of FIG. 1, financial service system 130C is also equipped with a wireless transmitter, so utility provider computing system 103C is capable of communicating with other devices, even without a connection to network 105.

Financial service system 130D has access to power in the example of FIG. 1, but is unable to communicate with other devices. The connection between financial service system 130D and network 105 is damaged, and financial service system 130D has no other means to communicate with other devices. In other words, financial service system 130D is either not equipped with the capability to communicate with other devices in a way not involving network 105, or such capability has been damaged by the event (e.g., a wireless transmitter associated with financial service system 130D was damaged by the event).

In another example, financial service system 130E does not have power as a result of the event. Financial service system 130E is therefore unable to communicate with other devices.

In the example of FIG. 1, and in accordance with one or more aspects of the present disclosure, drone 110 receives, from drone information system 109, information about the outage affecting affected area 101. Responsive to receiving the information about the outage, drone 110 travels to the vicinity of affected area 101. Drone 110 establishes a wireless communications station for devices within affected area 101, and thereby establishes wireless connectivity in affected area 101 (e.g., drone-enabled network 106). In some examples, drone 110 may deploy a retractable base station (e.g., eNodeB in 4G or Next Generation cellular communication system) to establish drone-enabled network 106. Drone 110 may be connected to an IP core network (e.g., the internet) through wireless, satellite, and/or microwave communication technologies. Drone 110 may leverage pre-existing service level agreements ("SLAs") with a cellular or other satellite service provider.

Drone-enabled network 106 is configured to send signals to devices within affected area 101 and to receive signals from devices within affected area 101. In some examples, drone-enabled network 106 may enable other devices within affected area 101 to communicate with each other and/or with devices outside affected area 101. For instance, drone-enabled network 106 may serve as a gateway to network 105 for devices within affected area 101 that have lost connectivity to network 105. In other examples, drone-enabled network 106 may serve as a gateway to a satellite network or other network that has connectivity to systems and/or devices outside of affected area 101 and/or otherwise connected to network 105. In particular, drone-enabled network 106 may enable financial service systems 130 to communicate with bank computing system 108 and utility provider computing system 103.

Drone 110 may communicate with both undamaged and damaged financial service systems 130 to assess connectivity within affected area 101. For instance, in the example of FIG. 1, drone 110 outputs one or more wireless signals (e.g. "exploration signals") over drone-enabled network 106. Financial service system 130A, which has power, connectivity with network 105, and the capability to wirelessly communicate with drone 110, responds to one or more of the wireless signals output by drone 110. Drone 110 receives the responsive signal from financial service system 130A, and determines, based on the responsive signal, the identity of financial service system 130A and information about the capabilities of financial service system 130A. Drone 110 stores information about the capabilities of financial service system 130A. For instance, drone 110 stores that financial service system 130A is being furnished with a stable power supply, is able to communicate with other devices over network 105, and is able to wirelessly communicate.

Although financial service system 130A is described in connection with FIG. 1 as responding to the wireless signal, in other examples, financial service system 130A may, alternatively, or in addition, communicate with drone 110 or other systems over network 105, since financial service system 130A still has connectivity to network 105. Similarly, rather than communicating with drone 110, financial service system 130A may communicate with bank computing system 108 over network 105. Bank computing system 108 may determine, based on interactions with financial service system 130A, that financial service system 130A is operational and connected to network 105, and therefore might not need to rely on alternate means of communication (e.g., drone-enabled network 106).

Drone 110 may also receive responses from damaged financial service systems 130. For instance, in the example of FIG. 1, financial service system 130B has been damaged by the event in such a way that it is no longer able to communicate with network 105. However, financial service system 130B has both power and the capability to wirelessly communicate with drone 110. Accordingly, financial service system 130B detects one or more of the wireless signals output by drone 110. Financial service system 130B responds by outputting a signal over drone-enabled network 106. Drone 110 detects a signal from financial service system 130B, and determines, based on the responsive signal, the identity of financial service system 130B and information about the capabilities of financial service system 130B. Drone 110 stores information about the capabilities of financial service system 130B. For instance, drone 110 stores that financial service system 130B is being furnished with a stable power supply, and is able to wirelessly communicate with other devices. In some examples, drone 110 may store information indicating that financial service system 130B is not able to communicate with other devices over network 105.

Similarly, financial service system 130C has both power and the capability to wirelessly communicate with drone 110. Accordingly, financial service system 130C detects one or more of the wireless signals output by drone 110. Financial service system 130C responds by outputting a signal over drone-enabled network 106, which drone 110 uses to determine the identity of financial service system 130C and information about the capabilities of financial service system 130C. Drone 110 stores information about financial service system 130C.

In the example of FIG. 1, financial service system 130D has been damaged by the event, and although it has access to power, it is no longer able to communicate with network 105. Financial service system 130D is unable to communicate with drone 110 over drone-enabled network 106. Accordingly, financial service system 130D may detect one or more of the wireless signals output by drone 110, but because financial service system 130D is unable to communicate over drone-enabled network 106, financial service system 130D does not respond to the wireless signals output by drone 110. In some examples, financial service system 130D might not even be able to detect wireless signals output by drone 110. Although drone 110 does not receive a response from financial service system 130D, drone 110 may, in some examples, store information indicating that financial service system 130D did not respond to the wireless signal.

Further, in the example of FIG. 1, financial service system 130E has been damaged by the event in such a way that it no longer has power. Accordingly, financial service system 130E neither detects any wireless signals output by drone 110 nor responds to such signals. Drone 110 does not receive a response from drone 110. Although drone 110 does not receive a response from financial service system 130E, drone 110 may, in some examples, store information indicating that financial service system 130E did not respond to the wireless signal.

In some examples, drone 110 attempts to communicate with all financial service systems 130 within affected area 101, even those that are not affiliated with bank computing system 108 or drone information system 109. In other examples, however, drone 110 seeks to communicate with only those financial service systems 130 controlled, configured, and/or affiliated with bank computing system 108 and/or drone information system 109. Drone 110 may receive, from drone information system 109 or from one or more bank computing systems 108, information sufficient to identify the affiliations of each of financial service systems 130.

Further, in the example described, one or more financial service systems 130 send wireless signals in response to a signal received from drone 110. In other examples, one or more financial service systems 130 might not wait to receive a signal from drone 110, and may alternatively, or in addition, output an informational wireless signal when it detects that it has lost connectivity to network 105.

One or more of financial service systems 130 may capture an image to verify that it is sufficiently accessible to perform its normal functions. For instance, in the example of FIG. 1, financial service system 130A has not been damaged in any significant way, and has power and connectivity to network 105. Bank computing system 108 sends a signal over network 105 to financial service system 130A. Financial service system 130A receives the signal, and determines that the signal corresponds to a request to capture an image of the surroundings near financial service system 130A. In the example of FIG. 1, financial service system 130A is configured with one or more cameras and/or sensors configured to capture images of areas physically surrounding financial service system 130A. Responsive to the request, financial service system 130A captures one or more images and communicates the images over network 105 to bank computing system 108. Bank computing system 108 analyzes the images and determines, based at least in part on the images, that financial service system 130A is sufficiently accessible to perform its usual functions (e.g., as point of sale device or financial kiosk).

In another example, drone 110 outputs a signal over drone-enabled network 106. Financial service system 130B, which is unable to communicate over network 105 but can communicate with drone 110 over drone-enabled network 106, detects the signal, and determines that the signal corresponds to a request capture an image of the physical surroundings near financial service system 130B. Financial service system 130B captures one or more images and communicates the images over drone-enabled network 106 to drone 110. Drone 110 analyzes the images and determines, based at least in part on the images, that financial service system 130B is sufficiently accessible to perform its usual functions. Alternatively, or in addition, drone 110 communicates the images over network 105 to bank computing system 108. Bank computing system 108 analyzes the images and determines, based at least in part on the images, that financial service system 130B is sufficiently accessible to perform its usual functions.

As described above, financial service systems 130 may capture images of surrounding areas. Alternatively, or in addition, drone 110 may also capture one or more images of one or more financial service systems 130 to verify that such financial service systems 130 are sufficiently accessible to perform their normal functions. For instance, in the example of FIG. 1, drone 110 captures multiple images of affected area 101 near where each of financial service systems 130 is expected to be located. In the example of FIG. 1, drone 110 captures one or more images of financial service system 130B. Drone 110 analyzes the images, and determines that financial service system 130B is physically accessible and/or is physically capable of performing one or more of its operations. For example, drone 110 determines, based on the images, that the area in which a user interacts with financial service system 130B is sufficiently clear of rubble, debris, or other obstructions, and further, since financial service system 130B is an ATM, that the physical structure of financial service system 130B appears to be able to perform ATM transactions (e.g., dispense cash, accept deposits). Drone 110 may repeat this procedure for each of financial service systems 130 within affected area 101. In some examples, images captured by drone 110 may be camera images, thermal images, or any other appropriate image.

Although analysis of the images is described as being performed at least partially by drone 110, in other examples, some or all of such analysis may be performed by another system. For instance, in some examples, drone 110 captures one or more images of financial service systems 130 within affected area 101. Drone 110 communicates the images to bank computing system 108 (e.g., over network 105). Bank computing system 108 analyzes the images and determines, based at least in part on the images, whether one or more of financial service systems 130 are sufficiently accessible to perform their usual functions. Bank computing system 108 communicates information about this analysis and any corresponding conclusions to drone 110.

In some examples, bank computing system 108, drone information system 109, or drone 110 may capture or receive an image that includes a logo, device number, or other indicia uniquely identifying one or more of financial service systems 130. As one example, drone information system 109 may receive an image of one of financial service systems 130 through a news report or social media post. Drone information system 109 may analyze the image and identify which of financial service systems 130 is associated with the image. Drone information system 109 may further analyze the image and determine information about the accessibility of the identified financial service system. Drone 110 determines, based on the input, whether the identified financial service system is physically accessible and/or is physically capable of performing one or more of its intended functions.

Drone 110 may alternatively, or in addition, receive or determine other information about the accessibility of one or more of financial service systems 130. For instance, in the example of FIG. 1, drone 110 receives input that drone 110 determines corresponds to information about the accessibility of one or more of financial service systems 130. Drone 110 may receive such input though drone-enabled network 106, through a satellite network, or through another network. Such input could be, for example, from users or technicians that have inspected the physical condition of one or more of financial service systems 130. Such input could be based on or derived from social media reports from users or technicians. For instance, bank computing system 108, drone information system 109, or another system may monitor information on network 105 (e.g., social media accounts, news reports, user communications), determine information about the accessibility of one or more of financial service systems 130, and communicate such information to drone 110.

Drone 110 may provide connectivity to one or more financial service systems 130 within affected area 101. For instance, in the example of FIG. 1, drone 110 communicates with financial service system 130B and establishes communications with financial service system 130B over drone-enabled network 106. Drone 110 configures financial service system 130B to be operational and also configures financial service system 130B to use drone-enabled network 106 for performing ATM transactions. Drone 110 communicates with bank computing system 108 (e.g., over network 105) and confirms that financial service system 130B is operational. Drone 110 may perform a similar procedure for one or more other financial service systems 130 within affected area 101.

Drone 110 may cause public display system 190 to present information about the location of operable or functioning financial service systems 130. For instance, in the example of FIG. 1, bank computing system 108 maintains, based on information received from drone 110, a map of each of the operational or apparently operational financial service systems 130 within affected area 101. Bank computing system 108 communicates information about the map over network 105 to drone 110. Drone 110 outputs a signal over drone-enabled network 106. Public display system 190 receives a signal over drone-enabled network 106 and determines that the signal includes information that can be used to generate data or computer instructions corresponding to a user interface, such as a user-viewable graphical user interface that may be presented on a display screen for viewing by a user. Public display system 190 generates user interface 191 (e.g., which may be data or computer instructions representing a collection of text, images, and/or other display objects in a form that can be used by a display screen to present an image including the text, images, and/or other display objects) and presents user interface 191 at public display system 190. In the example shown, user interface 191 is a map of affected area 101, and may identify the location of one or more of financial service systems 130. User interface 191 may further identify each of the financial service systems 130 that are determined to be operational, and may also indicate the functionality available at each of financial service systems 130 (e.g., cash available, deposits accepted, bank account information available, capable of performing credit card transactions, debit card transactions, etc.). Users within affected area 101 that are viewing or consulting public display system 190 for information may be able to determine the location of one or more financial service systems 130 and the functions that each such financial service system is capable of performing. In some examples, public display system 190 may be within a disaster relief center established in response to the event (e.g., a natural disaster, a terrorist act, or other event).

Drone 110 may also enable one or more mobile devices 195 to present information about the location of operable or functioning financial service systems 130. For instance, in the example of FIG. 1, drone 110 outputs one or more signals over drone-enabled network 106. One or more of mobile devices 195 may detect a signal and determine that the signal includes information that can be used by one or more mobile devices 195 to generate data, instructions, and/or other information representing a graphical user interface. For example, mobile device 195A may detect a signal, and generate, based on the signal, a set of instructions and data that can be used by a hardware device to present a set of information. In such an example, the set of instructions and data may be referred to as user interface 196A. Mobile device 195A, for example, may present user interface 196A at a display component associated with mobile device 195A. User interface 196A may include information about the location of one or more of financial service systems 130 within affected area 101, and such information may be presented in a map form. In addition, mobile device 195A may include within user interface 196A information identifying which of financial service systems 130 is closest to mobile device 195A within affected area 101, based on geolocation information detected by mobile device 195A. In this way, one or more of mobile devices 195 may directly receive information about operational and/or non-operational financial service systems 130 within affected area 101, and present an individualized user interface.

One or more of financial service systems 130 may perform ATM operations using drone-enabled network 106. For instance, in the example of FIG. 1, financial service system 130B receives input that it determines corresponds to a physical interaction by a user. Financial service system 130B further determines that the input corresponds to a request to perform an ATM transaction. Financial service system 130B presents one or more authentication challenges to the user through a user interface presented by financial service system 130B. Financial service system 130B receives further input and sends a signal over drone-enabled network 106. Drone 110 detects a signal over drone-enabled network 106 and sends a corresponding signal over network 105. Bank computing system 108 detects a signal and determines that the signal corresponds to authentication credentials associated with an identified bank account. Bank computing system 108 authenticates the user and sends a signal over network 105. Drone 110 detects the signal over network 105 and sends a corresponding signal over drone-enabled network 106. Financial service system 130B detects a signal over drone-enabled network 106 and determines that the user is an authenticated user of the identified account. Financial service system 130B receives further input, and determines that the input corresponds to a request to withdraw cash from the identified account. Financial service system 130B further communicates with bank computing system 108 over drone-enabled network 106 (and network 105) and determines that bank computing system 108 has authorized the withdrawal of the requested amount of cash. Financial service system 130B approves the request to withdraw cash and physically dispenses cash for the user at financial service system 130B.

One or more of financial service systems 130 may perform retail transactions using drone-enabled network 106. For instance, in the example of FIG. 1, financial service system 130C receives input that it determines corresponds to a physical interaction by an employee of gas station 198. Financial service system 130C further determines that the input corresponds to a request to perform a credit card transaction for a fuel purchase at gas station 198. Financial service system 130C outputs a signal over drone-enabled network 106. Drone 110 detects a signal and outputs a corresponding signal over network 105. Bank computing system 108 detects a signal over network 105 and determines that the signal includes information about a fuel purchase at gas station 198. Bank computing system 108 authorizes the purchase and outputs a signal over network 105. Drone 110 detects a signal over network 105 and outputs a corresponding signal over drone-enabled network 106. Financial service system 130C detects a signal over drone-enabled network 106 and determines that the signal corresponds to a credit card authorization for the fuel purchase. Financial service system 130C may generate and output a user interface confirming the transaction. Financial service system 130C may also update accounting records kept by gas station 198, and/or generate and output a physical receipt for the fuel purchase transaction.

In the examples described, financial service system 130B and financial service system 130C communicate with drone 110 over drone-enabled network 106, and then drone 110 communicates with bank computing system 108 over network 105. In other examples, one or more of financial service systems 130 may communicate with drone 110 over drone-enabled network 106, and drone 110 may then communicate with bank computing system 108 or other devices or systems over a different network (other than network 105), such as a satellite network or another network. Such a network may be established partially or solely for providing communications to affected area 101.

Drone 110 may share information collected about affected area 101 with other systems and/or entities. For instance, in the example of FIG. 1, drone 110 outputs a signal over network 105. Utility provider computing system 103 detects a signal over network 105 and determines that the signal corresponds to information about affected area 101. Utility provider computing system 103 may further determine that the signal includes information that may be helpful for repairing, reestablishing, and/or improving various utility services provided to affected area 101 by utility provider computing system 103 or the entity that operates utility provider computing system 103. For example, utility provider computing system 103 may control or help control operation of various power, gas, water, connectivity, or other utilities. Utility provider computing system 103 may use information received from drone 110 to repair, reestablish, and/or improve such utility services within affected area 101.

FIG. 1 illustrates one example implementation of system 100. Other example or alternate implementations of system 100 may be appropriate in other instances. Such implementations may include a subset of the devices and/or components included in the example of FIG. 1 and/or may include additional devices and/or components not shown in FIG. 1. Accordingly, although one or more implementations of system 100 have been described with reference to FIG. 1, system 100 may be implemented in a number of different ways.

For instance, one or more devices of system 100 that may be illustrated as separate devices may alternatively be implemented as a single device; one or more components of system 100 that may be illustrated as separate components may alternatively be implemented as a single component. Also, in some examples, one or more devices of system 100 that may be illustrated as a single device may alternatively be implemented as multiple devices; one or more components of system 100 that may be illustrated as a single component may alternatively be implemented as multiple components. Each of the multiple devices and/or components may be directly coupled via wired or wireless communication and/or remotely coupled via one or more networks. Also, one or more devices or components that may be illustrated in FIG. 1 may alternatively be implemented as part of another device or component not shown in FIG. 1.

Further, certain operations, techniques, features, and/or functions may have been described herein as being performed by specific components, devices, and/or modules in FIG. 1. In other examples, such operations, techniques, features, and/or functions may be performed by different components, devices, or modules. Accordingly, some operations, techniques, features, and/or functions that may have been described herein as being attributed to one or more components, devices, or modules in FIG. 1 may, in other examples, be attributed to other components, devices, and/or modules, even if not specifically described herein in such a manner.

By identifying and reconnecting financial infrastructure systems or transactions systems during an outage, drone 110 may enable financial service systems 130 within affected area 101 to reduce and/or shorten any loss of connectivity during an outage, and may even enable financial service systems 130 to regain connectivity soon after a catastrophic outage affecting physical connections to network 105. By reducing and/or shortening any loss of connectivity during an outage, financial service systems 130 may operate more consistently and reliably. By operating more reliably and consistently, financial service systems 130 will be more effective in performing financial transactions, particularly following outages that might otherwise require time-consuming efforts to rectify.

Further, by communicating with devices within affected area 101 (e.g., public display system 190 and/or mobile devices 195), drone 110 may be able to more effectively disseminate information about available services and available financial infrastructure systems within affected area 101. By effectively disseminating such information, those financial service systems 130 that are operable will be used productively, whereas those financial service systems 130 that are not operable will not be used. Attempts to use financial service systems 130 that are not operating properly not only may result in wasted energy, but also improper or erroneous financial transactions. Accordingly, by disseminating information about those financial service systems 130 that are operating properly, those financial service systems 130 that are not operating properly may be used less, thereby having the effect of consuming less electrical power and avoiding improper or erroneous financial transactions. Since the original networking, cellular, or other communication infrastructure (e.g., one or more base stations) are inoperable, drone 110 and/or drone-enabled network 106 can provide communication services (e.g., cellular services) to a computing device possessed by a user. These services might not be full-fledged services (e.g. high-speed data, voice, multimedia), but may be reduced-scale services (e.g. low speed, data only, and/or voice only, etc.), depending on the available bandwidth. By providing reduced-scale services, drone 110 may be able to conserve power, operate for a longer time, serve more users, or provide other services.

Figure 2:
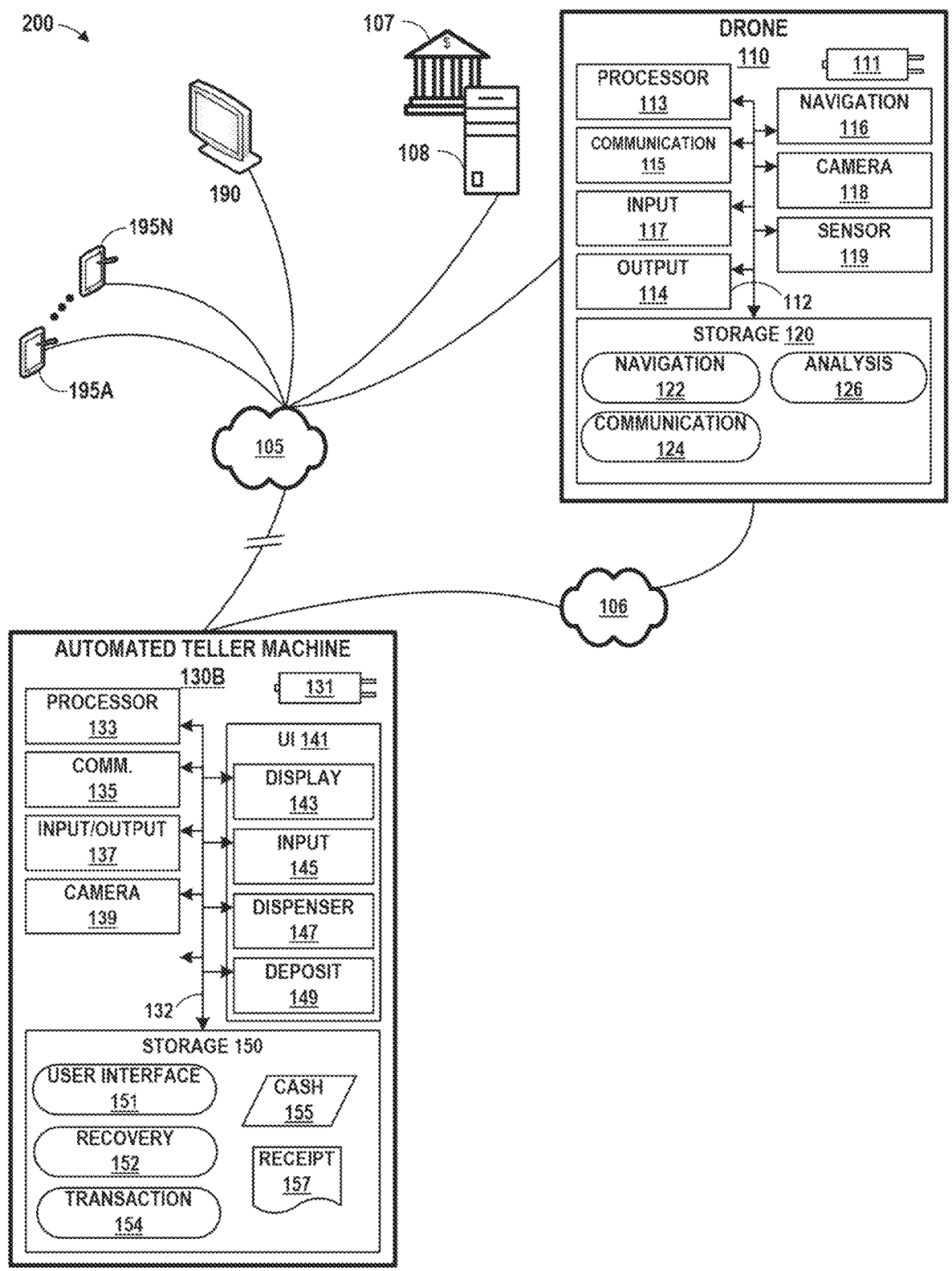
FIG. 2 is a block diagram illustrating an example system for identifying and reconnecting financial infrastructure systems or financial service systems during an outage, in accordance with one or more aspects of the present disclosure.

FIG. 2 is a block diagram illustrating an example system for identifying and reconnecting financial infrastructure systems or financial service systems during an outage, in accordance with one or more aspects of the present disclosure. System 200 of FIG. 2 may be described as an example or alternate implementation of system 100 of FIG. 1. One or more aspects of FIG. 2 may be described herein within the context of FIG. 1.

In the example of FIG. 2, system 200 includes network 105, drone-enabled network 106, drone 110, financial service system 130B, bank computing system 108, public display system 190, mobile device 195A through mobile device 195N ("mobile devices 195"). Systems, devices, or components illustrated in FIG. 2 may correspond to like-numbered systems, devices, or components illustrated in FIG. 1, and may be implemented in a manner consistent with the description provided in connection with FIG. 1.

Network 105 may be the internet, or may include or represent any public or private communications network or other network. For instance, network 105 may be or include a cellular, Wi-Fi®, ZigBee, Bluetooth, Near-Field Communication (NFC), satellite, enterprise, service provider, and/or other type of network enabling transfer of transmitting data between computing systems, servers, and computing devices. Network 105 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems).

One or more drones 110 may include power source 111, one or more processors 113, one or more communication units 115, one or more input devices 117, one or more output devices 114, one or more navigation units 116, one or more cameras 118, one or more sensors 119, and one or more storage devices 120. In the example of FIG. 2, storage device 120 includes navigation module 122, analysis module 126, and communication module 124. One or more of the devices, modules, storage areas, or other components of drone 110 may be interconnected to enable inter-component communications (physically, communicatively, and/or operatively). In some examples, such connectivity may be provided by through communication channels (e.g., communication channel 112), a system bus, a network connection, an inter-process communication data structure, or any other method for communicating data. In FIG. 2, drone 110 may be implemented in a manner consistent with the description provided in connection with FIG. 1, and may include the same capabilities as described in connection with FIG. 1. In other examples, drone 110 of FIG. 2 may be implemented in a manner different than that described in connection with FIG. 1. For example, drone 110 of FIG. 2 may include more capabilities than those described in connection with FIG. 1, less capabilities than those described in connection with FIG. 1, or capabilities different than those described in connection with FIG. 1.

Power source 111 of drone 110 may provide power to one or more components of drone 110. Power source 111 may be a battery or a device (such as solar cells) that supplies direct current (DC), or AC depending on the power, electrical, or other needs of the components mounted on the drone 110. In some examples, power source 111 may generate power through means other than a battery, including, for example, a combustible engine. One or more of the devices or components illustrated within drone 110 may be connected to power source 111, and/or may receive power from power source 111. Power source 111 may have intelligent power management or consumption capabilities, and may such features may be controlled, accessed, or adjusted by one or more modules of drone 110 and/or by one or more processors 113 to intelligently consume, allocate, supply, or otherwise manage power.

One or more processors 113 of drone 110 may implement functionality and/or execute instructions associated with drone 110 or associated with one or more modules illustrated herein and/or described below. One or more processors 113 may be, may be part of, and/or may include processing circuitry that performs operations in accordance with one or more aspects of the present disclosure. Examples of processors 113 include microprocessors, application processors, display controllers, auxiliary processors, one or more sensor hubs, and any other hardware configured to function as a processor, a processing unit, or a processing device. Drone 110 may use one or more processors 113 to perform operations in accordance with one or more aspects of the present disclosure using software, hardware, firmware, or a mixture of hardware, software, and firmware residing in and/or executing at drone 110.

One or more communication units 115 of drone 110 may communicate with devices external to drone 110 by transmitting and/or receiving data, and may operate, in some respects, as both an input device and an output device. In some examples, communication units 115 may communicate with other devices over a network. In other examples, communication units 115 may send and/or receive radio signals on a radio network such as a cellular radio network. In other examples, communication units 115 of drone 110 may transmit and/or receive satellite signals on a satellite network including, for example, a Global Positioning System (GPS) network.

In some examples, communication units 115 may include or be capable of deploying a retractable base station (e.g., eNodeB in 4G or Next Generation cellular communication system) to establish drone-enabled network 106. Communication units 115 may enable connection to an IP core network (e.g., the public internet, or the dedicated IP network that belongs to the cellular or other communications system operator) through wireless, satellite, and/or microwave communication technologies. Communication units 115 may be capable of monitoring or complying with service level agreements ("SLAs") with a cellular, satellite, or other connectivity service provider.

Examples of communication units 115 include an optical transceiver, a radio frequency transceiver, a GPS receiver, or any other type of device that can send and/or receive information. Other examples of communication units 115 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, 3GPP specific protocols or other technologies or protocols.

One or more navigation units 116 may operate to control the flight of drone 110. In some examples, navigation unit 116 may be capable of detecting a position by detecting global position system ("GPS") coordinates, navigating to a new position or location as specified by a set of GPS coordinates, holding a GPS position, and/or stabilizing drone 110. Navigation unit 116 may comprise multiple rotors, propellers, and/or blades that can be used to generate lift, thereby raising drone 110 off the ground. Such rotors, propellers, and/or blades may similarly be used to self-stabilize drone 110. Navigation unit 116 may respond to input from a controller or from navigation module 122, and thereby adjust the rotation speed, the angle, and/or the position of one or more rotors, propellers, and/or blades. Where drone 110 is implemented as a land or water vehicle, navigation unit 116 may be configured to alternatively, or in addition, control the movement of drone 110 on land or water.

One or more cameras 118 may generally refer to any appropriate type of image acquisition devices, such as a camera or charge-coupled device. Camera 118 may include an array of sensing elements that detect and/or convey light, images, movement, or other information. Camera 118 may include one or more infrared cameras, thermographic cameras, thermal imaging cameras, light-sensitive cameras, range sensors, tomography devices, radar devices, or ultrasonic cameras. In some examples, cameras 118 may include, but are not limited to, arrays of charge-coupled devices (CCD), active pixel sensors in complementary metal-oxide-semiconductor (CMOS) devices, N-type metal-oxide-semiconductor technologies, or other sensing elements. Any appropriate device whether now known or hereafter devised that is capable of detecting and/or conveying information constituting an image, sequence of images, or a video may appropriately serve as camera 118.

One or more cameras 118 may include an image and/or video processor for processing detected images or other information. For example, an image or video processor may perform adjustments to images detected by camera 118 to improve image quality or clarity, reduce background noise, or for another purpose. An image or video processor associated with camera 118 may encrypt images, video information, indications of video information by applying a public or private encryption key pursuant to an encryption algorithm. In some examples, one or more cameras 118 may include an image capture device appropriate for application of computer vision techniques. Depending on the type of sensors or cameras used, the resulting image may include two-dimensional images, three-dimensional volumes, or an image sequence.

One or more sensors 119 may include any of a variety of types of sensors. For example, sensors 119 may include an accelerometer that generates accelerometer data. Accelerometer data may indicate an acceleration and/or a change in acceleration of drone 110. Sensors 119 may include a gyrometer that generates gyrometer data. Gyrometer data may indicate a physical orientation and/or change in physical orientation of drone 110. In some examples, the orientation may be relative to one or more reference points. Sensors 119 may include a magnetometer that generates magnetometer data. Magnetometer data may indicate the magnetization of an object that is touching or in proximity to drone 110. Magnetometer data may indicate the Earth's magnetic field, and in some examples, provide directional functionality of a compass. Sensors 119 may include an ambient light sensor that generates ambient light data. The ambient light data may indicate an intensity of light to which drone 110 is exposed. Sensors 119 may include a proximity sensor that generates proximity data. Proximity data may indicate whether an object is within proximity to drone 110. In some examples, proximity data may indicate how close an object is to drone 110. In some examples, sensors 119 may include a clock that generates date and time data (e.g., the current date and time). Sensors 119 may include temperature sensor that measures ambient temperature in proximity to sensors 119. The ambient temperature may indicate an intensity of temperature. Sensors 119 may include one or more location sensors capable of determining information about the location of drone 110.

Sensors 119 may include one or more GPS devices that use satellite data to calculate a global position. In other examples, sensors 119 may alternatively, or in addition, use information from cell towers, Wi-Fi® networks, or other network information to triangulate location information or approximate location information. Sensors 119 may output location information or indications of location information reflecting one or more locations at which drone 110 is positioned or located.

One or more input devices 117 may represent any input devices of drone 110 not otherwise separately described herein in connection with drone 110. Input devices 117 may generate, receive, and/or process input. One or more output devices 114 may represent any output devices of drone 110 not otherwise separately described herein. Output devices 114 may generate, present, and/or process output. For example, one or more output devices 114 may generate, present, and/or process output in the form of audio, visual, or other output (e.g., a haptic response, a sound, a flash of light). Some devices may serve as both input and output devices. For example, a communication device may both send and receive data to and from other systems or devices over a network.

One or more storage devices 120 within drone 110 may store information for processing during operation of drone 110. Storage devices 120 may store program instructions and/or data associated with one or more of the modules described in accordance with one or more aspects of this disclosure. One or more processors 113 and one or more storage devices 120 may provide an operating environment or platform for such modules, which may be implemented as software, but may in some examples include any combination of hardware, firmware, and software. One or more processors 113 may execute instructions and one or more storage devices 120 may store instructions and/or data of one or more modules. The combination of processors 113 and storage devices 120 may retrieve, store, and/or execute the instructions and/or data of one or more applications, modules, or software. Processors 113 and/or storage devices 120 may also be operably coupled to one or more other software and/or hardware components, including, but not limited to, one or more of the components of drone 110 and/or one or more devices or systems illustrated as being connected to drone 110.

In some examples, one or more storage devices 120 are temporary memories, meaning that a primary purpose of the one or more storage devices is not long-term storage. Storage devices 120 of drone 110 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 120, in some examples, also include one or more computer-readable storage media. Storage devices 120 may be configured to store larger amounts of information than volatile memory. Storage devices 120 may further be configured for long-term storage of information as non-volatile memory space and retain information after activate/off cycles. Examples of non-volatile memories include static storage devices or solid state drives, magnetic hard disks, optical discs, floppy disks, Flash memories, or forms of electrically programmable memories (EPROM) or electrically erasable and programmable (EEPROM) memories.

Navigation module 122 may perform functions relating to navigating and/or controlling drone 110 during travel to the vicinity of an affected area. Navigation module 122 may monitor one or more sensors 119 to determine the current location of drone 110. Navigation module 122 may determine, based on the current location of drone 110, a path to affected area 101. Navigation module 122 may cause navigation unit 116 to propel drone 110 in the direction of the affected area 101 and/or along the path affected area 101. Navigation module 122 may eventually determine that drone 110 is at or near affected area 101, and navigation module 122 may cause navigation unit 116 to ensure drone 110 remains in affected area 101. For example, navigation module 122 may control navigation unit 116 to cause drone 110 to hover over affected area 101.

Communication module 124 may perform functions relating to establishing communications with one or more financial service systems 130 within affected area 101, and thereby enable financial transactions to take place within affected area 101. Communication module 124 may cause communication units 115 to establish drone-enabled network 106. Communication module 124 may cause communication units 115 to output signals over drone-enabled network 106 and/or communicate with financial service systems 130 over drone-enabled network 106. Communication module 124 may cause communication units 115 to output signals to query one or more financial service systems 130 for information about their condition or capabilities. Communication module 124 may receive indications of input from communication units 115 and output to analysis module 126 information about the input. Communication module 124 may cause communication units 115 to further communicate with financial service systems 130 over drone-enabled network 106 to establish a secure channel for enabling financial transactions to take place. Communication module 124 may be the primary controller of communication units 115.

Analysis module 126 may perform various analysis functions for drone 110. For instance, analysis module 126 may analyze information to determine that an outage has occurred and/or the nature of the outage. Analysis module 126 may output to navigation module 122 information about the outage sufficient to enable navigation module 122 to navigate drone 110 to the vicinity of the outage. Analysis module 126 may analyze signals received from one or more financial service systems 130, and determine connectivity and other capabilities of financial service systems 130. Analysis module 126 may analyze information to determine whether one or more financial service systems 130 are physically accessible and/or capable of communicating over drone-enabled network 106. Analysis module 126 may also analyze power source 111 to determine the remaining battery life.

Financial service system 130B, as illustrated in FIG. 2, corresponds to financial service system 130B of FIG. 1, and is illustrated as an example automated teller machine described in connection with in FIG. 1. Financial service system 130B may be implemented as any suitable computing system, and may incorporate one or more computing devices. Financial service system 130B may alternatively, or in addition, use cloud computing resources available over network 105 or another network. In some examples, financial service system 130B provides banking or other financial services to users physically present at or near financial service system 130B. For example, financial service system 130B may host or provide access to banking services provided by bank computing system 108, and may dispense or receive cash or other financial instruments.

Although financial service system 130B of FIG. 2 may be a stand-alone device, financial service system 130B may be implemented in any of a wide variety of ways, and may be implemented using multiple devices and/or systems. In other examples, financial service system 130B may be, or may be part of, any component, device, or system that includes a processor or other suitable computing environment for processing information or executing software instructions and that operates in accordance with one or more aspects of the present disclosure. In some examples, financial service system 130B may be fully implemented as hardware in one or more devices or logic elements.

In the example of FIG. 2, financial service system 130B may include power source 131, one or more processors 133, one or more communication units 135, one or more cameras 139, one or more input/output devices 137, one or more user interface devices 141, and one or more storage devices 150. User interface device 141 may include one or more displays 143, one or more input devices 145, one or more cash dispensers 147, and one or more deposit receptacles 149. Storage device 150 may include user interface module 151, recovery module 152, transaction module 154, and cash 155. Financial service system 130B may include or be capable of generating one or more receipts 157. One or more of the devices, modules, storage areas, or other components of financial service system 130B may be interconnected to enable inter-component communications (physically, communicatively, and/or operatively). In some examples, such connectivity may be provided by through communication channels (e.g., communication channels 132), a system bus, a network connection, an inter-process communication data structure, or any other method for communicating data.

Power source 131 may provide power to one or more components of financial service system 130B. Power source 131 may receive power from the primary alternating current (AC) power supply in a building, home, or other location. In other examples, power source 131 may be a battery or a device that supplies direct current (DC). In still further examples, financial service system 130B and/or power source 131 may receive power from another source. One or more processors 133 of financial service system 130B may implement functionality and/or execute instructions associated with financial service system 130B or associated with one or more modules illustrated herein and/or described below. One or more communication units 135 of financial service system 130B may communicate with devices external to financial service system 130B by transmitting and/or receiving data. In some examples, communication units 135 may communicate with other devices over network 105, drone-enabled network 106, or any other wired or wireless network. For instance, communication units 135 may send and/or receive radio signals on a radio network such as a cellular radio network. In other examples, communication units 135 of financial service system 130B may transmit and/or receive satellite signals on a satellite network including, for example, a Global Positioning System (GPS) network.

One or more input/output devices 137 may represent input or output devices of financial service system 130B not otherwise separately described herein. One or more input/output devices 137 may generate, receive, and/or process input from any type of device capable of detecting input from a human or machine. One or more input/output devices 137 may generate, present, and/or process output through any type of device capable of producing output. Some devices may serve as only input devices, some devices may serve as only output devices, and some devices may serve as both input and output devices.

One or more cameras 139 may generally refer to any appropriate type of image acquisition devices, such as an image sensor or charge-coupled device. Camera 139 may include an array of sensing elements as described in connection with camera 118 of drone 110, and may include any of the capabilities and/or image capture technologies described in connection with camera 118. As in camera 118, camera 139 may include an image and/or video processor for processing detected images or other information to capture, process, or generate a variety of images, including two-dimensional images, three-dimensional volumes, or an image sequence.

User interface device 141 may function as an input and/or output device or set of input/output devices for financial service system 130B, and may be implemented using various devices, components, and/or technologies. User interface device 141 may include presence-sensitive input panel technologies, microphone technologies, voice activation and/or recognition technologies, cameras, sensor technologies (e.g., infrared, image, location, motion, accelerometer, gyrometer, magnetometer), or other input device technology for use in receiving user input; user interface device 141 may include display devices, speaker technologies, haptic feedback technologies, tactile feedback technologies, light emitting technologies, or other output device technologies for use in outputting information to a user.

In the example of FIG. 2, user interface device 141 includes one or more displays 143, one or more input devices 145, one or more cash dispensers 147, and one or more deposit receptacles 149. Although certain components associated with financial service system 130B are described or illustrated in FIG. 2 as being implemented within user interface device 141, in other examples, such components could be implemented external to user interface device 141, and other components could be implemented within user interface device 141. Further, while illustrated as an internal component of financial service system 130B, user interface device 141 may also represent an external or partially external component that shares a data path with financial service system 130B for transmitting and/or receiving input and output. For instance, in some examples, user interface device 141 represents a built-in component of financial service system 130B located within and physically connected to the external packaging of financial service system 130B (e.g., a touch-screen screen housed within an ATM). In other examples, user interface device 141 represents an external component of financial service system 130B located outside and physically separated from the packaging or housing of financial service system 130B (e.g., a monitor, a projector, etc. that shares a wired and/or wireless data path with financial service system 130B). In still other examples, one or more components of user interface device 141 may be built-in components of financial service system 130B, and one or more components of user interface device 141 may be external components of financial service system 130B (e.g., some components of user interface device 141 may be internal, and others may be external). Further, one or more components of user interface device 141 may be integrated together, so that one component is or appears to be a built-in component of another. For example, a display device and a presence-sensitive panel may be used together to implement a touch-screen display.

One or more displays 143 may generally refer to any appropriate type of display device, such as a display typically associated with any type of computing device. Display 143 may function as one or more output (e.g., display) devices using technologies including liquid crystal displays (LCD), dot matrix displays, light emitting diode (LED) displays, organic light-emitting diode (OLED) displays, e-ink, or similar monochrome or color displays capable of generating tactile, audio, and/or visual output. Display 143 may include a cathode ray tube (CRT) monitor, liquid crystal display (LCD), Light-Emitting Diode (LED) display, or any other type of display device. Display 143 may output information to a user in the form of a user interface, which may be associated with functionality provided by financial service system 130B. Such user interfaces may be associated with computing platforms, operating systems, applications, and/or services executing at or accessible from financial service system 130B (e.g., an ATM banking application). For example, display 143 may present one or more user interfaces which are graphical user interfaces of an application executing at financial service system 130B including various graphical elements displayed at various locations of display 143.

User interface device 141 may include one or more input devices 145, which may generate, receive, and/or process input. For example, one or more input devices 145 may generate or receive input from an ATM keyboard or keypad. Financial service system 130B may include input devices such as a voice responsive system, a video camera, a button, sensor, mobile input device, control pad, microphone, presence-sensitive screen, network, or any other type of device for detecting input from a human or machine.

One or more cash dispensers 147 may represent a mechanism for physically dispensing or distributing cash to a user. Cash dispenser 147 may be primarily controlled by transaction module 154, and may be configured and physically secured so that cash dispenser 147 dispenses cash 155 only when it receives an authenticated command to do so from recovery module 152. Cash dispenser 147 may also be configured to generate one or more receipts 157 and dispense such receipts 157 to a user.

One or more deposit receptacles 149 may represent a mechanism for accepting items of value from a user, such as cash, checks, or other items. Deposit receptacle 149 may also be primarily controlled by transaction module 154, and may be configured and physically constructed so that deposit receptacle 149 is capable of securely storing items received from a user.

One or more storage devices 150 within financial service system 130B may store information for processing during operation of financial service system 130B. Storage devices 150 may store program instructions and/or data associated with one or more of the modules described in accordance with one or more aspects of this disclosure. One or more processors 133 and one or more storage devices 150 may provide an operating environment or platform for such modules, which may be implemented as software, but may in some examples include any combination of hardware, firmware, and software. One or more processors 133 may execute instructions and one or more storage devices 150 may store instructions and/or data of one or more modules. The combination of processors 133 and storage devices 150 may retrieve, store, and/or execute the instructions and/or data of one or more applications, modules, or software.

Processors 133 and/or storage devices 150 may also be operably coupled to one or more other software and/or hardware components, including, but not limited to, one or more of the components of financial service system 130B and/or one or more devices or systems illustrated as being connected to financial service system 130B.

User interface module 151 may manage user interactions with user interface device 141 and other components of financial service system 130B. User interface module 151 may output instructions or data corresponding to user interfaces (e.g., user interface 191 or user interface 196A) to user interface device 141. User interface device 141 (which may include, for example, a display or an audio output device) may present such user interfaces for display or presentation or otherwise, as a user of financial service system 130B views, hears, or otherwise senses output and/or provides input at user interface device 141. User interface device 141 may detect input, and may output to user interface module 151 one or more indications of input as a user of financial service system 130B interacts with a user interface presented at user interface device 141. User interface module 151 and user interface device 141 may interpret inputs detected at user interface device 141 and may relay information about the inputs detected at user interface device 141 to one or more associated platforms, operating systems, applications, and/or services executing at financial service system 130B to cause financial service system 130B to perform one or more functions.

User interface module 151 may receive information and instructions from a platform, operating system, application, and/or service executing at financial service system 130B and/or one or more remote computing systems. In addition, user interface module 151 may act as an intermediary between a platform, operating system, application, and/or service executing at financial service system 130B and various output devices of financial service system 130B (e.g., speakers, LED indicators, audio or electrostatic haptic output devices, light emitting technologies, displays, etc.) to produce output (e.g., a graphic, a flash of light, a sound, a haptic response, etc.).

User interface module 151 may perform operations described using software, hardware, firmware, or a mixture of hardware, software, and firmware residing in and/or executing at financial service system 130B. Financial service system 130B may execute user interface module 151 with multiple processors or multiple devices, as a virtual machine executing on underlying hardware, as one or more services of an operating system or computing platform, and/or as one or more executable programs at an application layer of a computing platform.

Recovery module 152 may perform functions relating to operation of financial service system 130B during or after an outage. For instance, recovery module 152 may receive an indication of a signal corresponding to a request for information about the condition, communication capabilities, and/or other capabilities of financial service system 130B. Recovery module 152 may determine information about the capabilities and condition of financial service system 130B by executing diagnostic tests, querying other modules or components of financial service system 130B, or in other ways. Recovery module 152 may also determine information about the physical surroundings of financial service system 130B, such as by capturing an image or video, or evaluating one or more sensors associated with financial service system 130B. Recovery module 152 may cause communication units 135 to output a signal over drone-enabled network 106, reporting information determined about the conditions and/or capabilities of financial service system 130B.

Transaction module 154 may perform functions relating to performing financial or transaction-based operations of an automated teller machine. For example, transaction module 154 may, based on an indication of input, determine that a user has inserted an ATM card and has interacted with a user interface presented by user interface device 141 by entering a pin number. Transaction module 154 may cause communication units 135 to output signals over drone-enabled network 106 destined for bank computing system 108. Transaction module 154 may determine that the user is an authenticated user, based on one or more signals received over network 105 and/or drone-enabled network 106. Transaction module 154 may cause user interface module 151 to present one or more user interfaces at display 143. Transaction module 154 may, based on user input and/or communications with bank computing system 108 over one or more networks, cause financial service system 130B to perform one or more physical operations. For instance, transaction module 154 may cause cash dispenser 147 to dispense cash. Transaction module 154 may also cause deposit receptacle 149 to accept items for deposit.

In the example of FIG. 2, and in accordance with one or more aspects of the present disclosure, drone 110 may travel to affected area 101 after an event affecting systems or devices within affected area 101. For instance, in the example of FIG. 2, input device 117 of drone 110 detects input and outputs to analysis module 126 an indication of input. Analysis module 126 determines that the input corresponds to information about an outage pertaining to affected area 101. In some examples, the input detected by input device 117 may be user input, or may be input derived from signals received by communication units 115. Alternatively, or in addition, analysis module 126 may determine information about an outage on the basis of an analysis of public or private information otherwise available to drone 110. Analysis module 126 outputs to navigation module 122 information about the outage. Navigation module 122 causes navigation unit 116 to navigate drone 110 to the vicinity of affected area 101. Navigation module 122 monitors one or more sensors 119 to determine the current location of drone 110. Sensor 119 detects input about the location of drone 110 when drone 110 is near affected area 101. Sensor 119 outputs to navigation module 122 an indication of input. Navigation module 122 determines that the input corresponds to an indication that drone 110 is at or near affected area 101. Navigation module 122 further determines that drone 110 has arrived at or near affected area 101. Navigation module 122 causes navigation unit 116 to ensure drone 110 remains in affected area 101, and may control navigation unit 116 to cause drone 110 to hover over affected area 101.

While hovering over affected area 101, drone 110 may establish communications with one or more financial service systems 130 within affected area 101. For instance, in the example of FIG. 2, navigation module 122 outputs to communication module 124 information about the location of drone 110. Navigation module 122 determines that the information indicates that drone 110 has arrived at its destination (e.g., affected area 101), and should establish communications with any available devices within affected area 101. Communication module 124 causes communication units 115 to establish a communications station and/or drone-enabled network 106. As in FIG. 1, communication module 124 may cause communication units 115 to may deploy a retractable base station (e.g., an eNodeB base station) included within communication units 115, and thereby establish drone-enabled network 106. Other techniques for establishing drone-enabled network 106 may be used in other examples. Drone-enabled network 106 enables devices within the vicinity of affected area 101 to receive signals from drone 110 and send signals to drone 110. In some examples, drone-enabled network 106 serves as a gateway to network 105.

Drone 110 may query one or more financial service systems 130 within affected area 101 for information about their conditions and/or capabilities. For instance, in the example of FIG. 2, communication module 124 causes communication units 115 to output a signal over drone-enabled network 106. Communication units 135 of financial service system 130B detects a signal over drone-enabled network 106 and outputs to recovery module 152 an indication of a signal. Recovery module 152 determines, based on the indication of the signal, that the signal corresponds to a request for information about the condition and/or capabilities of financial service system 130B (e.g., including information about the communication abilities of financial service system 130B). Recovery module 152 determines information about its capabilities and condition. Recovery module 152 may further determine information about the physical surroundings of financial service system 130B, such as by capturing an image or video, or evaluating one or more sensors associated with financial service system 130B. Such information may be helpful in determining whether financial service system 130B is physically accessible (e.g., not buried under rubble or otherwise blocked from user access).

Financial service system 130B may respond to the signal sent by drone 110 with information about its capabilities. For instance, in the example of FIG. 2, recovery module 152 causes communication units 135 to output a signal over drone-enabled network 106. Communication units 115 of drone 110 detect a signal and outputs to communication module 124 an indication of the signal. Communication module 124 outputs to analysis module 126 information about the signal. Analysis module 126 analyzes the information about the signal and determines that the signal corresponds to a response to the signal previously sent by drone 110 over drone-enabled network 106. Analysis module 126 further determines that the signal indicates that financial service system 130B is unable to access bank computing system 108 over network 105, but is otherwise capable of performing the functions of an ATM.

Analysis module 126 may further determine that the signal received from financial service system 130B includes information that may be used to determine that financial service system 130B is physically accessible. Such information may include images and/or videos of the surroundings of financial service system 130B, or information derived from sensors associated with financial service system 130B. Analysis module 126 may undertake an analysis of such information, and may further analyze additional information, including information derived from social networks, user input, and/or other sources. In some examples, drone 110 may collect some or all of such data, and communicate information about the data to bank computing system 108. Bank computing system 108 may perform the analysis, and output to drone 110 information about the results of the analysis, including whether financial service system 130B is physically accessible. If drone 110 determines or is informed that financial service system 130B is physically accessible, communication module 124 causes communication units 115 to further communicate with financial service system 130B over drone-enabled network 106 to establish a secure channel for enabling the operation of financial service system 130B.

Financial service system 130B may authenticate a user seeking to perform an ATM transaction. For instance, in the example of FIG. 2, input device 145 of financial service system 130B detects input. Input device 145 outputs to user interface module 151 an indication of input. User interface module 151 outputs to transaction module 154 information about the input. Transaction module 154 determines that the input corresponds to a user interacting with financial service system 130B. For example, transaction module 154 may determine that a user has inserted an ATM card and has interacted with a user interface presented by user interface device 141 by entering a pin number. Transaction module 154 causes communication units 135 to output a signal over drone-enabled network 106. Communication units 115 of drone 110 detect a signal and outputs to communication module 124 an indication of the signal. Communication module 124 determines that the signal corresponds to information intended for bank computing system 108. Communication module 124 causes communication units 115 to output a signal over network 105. Bank computing system 108 detects a signal over network 105 and determines that the signal includes authentication credentials for a user seeking to perform an ATM transaction at financial service system 130B. Bank computing system 108 authenticates the user based on the authentication credentials. Bank computing system 108 outputs a signal over network 105. Drone 110 detects a signal and determines that the signal is intended for financial service system 130B. Communication units 115 of drone 110 outputs a signal over drone-enabled network 106. Communication units 135 of financial service system 130B detect a signal and outputs an indication of a signal to transaction module 154. Transaction module 154 determines that the signal authenticates the user of financial service system 130B (e.g., the pin number using input device 145 corresponds to the account associated with the ATM card), and thereby authenticates the user. Transaction module 154 causes user interface module 151 to present a user interface at display 143 indicating that the user has been authenticated.

Affected area 101 may enable ATM cash withdrawals to take place within affected area 101. For instance, in the example of FIG. 2, and after user authentication, input device 145 of financial service system 130B detects further input and outputs an indication of input to user interface module 151. User interface module 151 outputs to transaction module 154 information about the input. Transaction module 154 determines that the input corresponds to a request to withdraw cash. Transaction module 154 causes communication units 135 to output a signal over drone-enabled network 106. Communication units 115 of drone 110 detect a signal. Drone 110 determines that the signal includes information intended for bank computing system 108. Drone 110 causes communication units 115 to output a signal over network 105. Bank computing system 108 detects a signal and determines that the signal corresponds to a request, by an authenticated user, to withdraw a specified amount of cash. Bank computing system 108 authorizes the withdrawal of the requested amount of cash. Bank computing system 108 sends a signal over network 105. Communication units 115 of bank computing system 108 detects a signal, and passes along the signal over drone-enabled network 106. Communication units 135 of financial service system 130B detects a signal and outputs to transaction module 154 an indication of the signal. Transaction module 154 determines that the signal corresponds to an authorization to dispense the requested amount of cash. Transaction module 154 causes cash dispenser 147 to access cash 155 and dispense the requested amount of cash.

Affected area 101 may enable other types of ATM transactions to be performed within affected area 101. For instance, in the example of FIG. 2, input device 145 detects further input that transaction module 154 determines corresponds to a request to make a deposit. Transaction module 154 causes deposit receptacle 149 to open, thereby enabling a user to insert one or more items for deposit. Deposit receptacle 149 detects the insertion of one or more items and accepts the items. Deposit receptacle 149 outputs to transaction module 154 information about the accepted items. Transaction module 154 determines that the accepted items correspond to deposited items from the user. Transaction module 154 causes communication units 135 to output a signal over drone-enabled network 106. Communication units 115 of drone 110 detect a signal over drone-enabled network 106, and communicates a corresponding signal over network 105. Bank computing system 108 detects a signal over network 105 and sends a responsive signal to drone 110 over network 105. Communication units 115 of drone 110 receives the responsive signal and sends a signal to financial service system 130B. Communication units 135 of financial service system 130B detects a signal over drone-enabled network 106. Transaction module 154 generates, based on the signal, a user interface. Transaction module 154 causes user interface module 151 to present the user interface, which notifies the user that the ATM transaction was successful. During or after the session, transaction module 154 may cause cash dispenser 147 to generate one or more receipts 157 to memorialize the transactions performed on behalf of the user, and output the receipts 157 for the user.

Modules illustrated in FIG. 2 (e.g., navigation module 122, communication module 124, analysis module 126, user interface module 151, recovery module 152, and transaction module 154) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

FIG. 2 illustrates one example implementation of system 200. Other example or alternate implementations of system 200 may be appropriate in other instances. Such implementations may include a subset of the devices and/or components included in the example of FIG. 2 and/or may include additional devices and/or components not shown in FIG. 2. Accordingly, although one or more implementations of system 200 have been described with reference to FIG. 2, system 200 may be implemented in a number of different ways.

For instance, one or more devices of system 200 that are illustrated as separate devices may be implemented as a single device; one or more components of system 200 that are illustrated as separate components may be implemented as a single component. Also, in some examples, one or more devices of system 200 that are illustrated as a single device may be implemented as multiple devices; one or more components of system 200 that are illustrated as a single component may be implemented as multiple components. Each of the multiple devices and/or components may be directly coupled via wired or wireless communication and/or remotely coupled via one or more networks. Also, one or more devices or components illustrated in FIG. 2 may also be implemented as part of another device or component not shown in FIG. 2. In this and other ways, some of the functions described herein may be performed via distributed processing by two or more devices.

Further, certain operations, techniques, features, and/or functions have been described herein as being performed by specific components, devices, and/or modules in FIG. 2. In other examples, such operations, techniques, features, and/or functions may be performed by different components, devices, or modules. Accordingly, some operations, techniques, features, and/or functions described herein as being attributed to one or more components, devices, or modules in FIG. 2 may, in other examples, be attributed to other components, devices, and/or modules, even if not specifically described herein in such a manner.

Figure 3A:
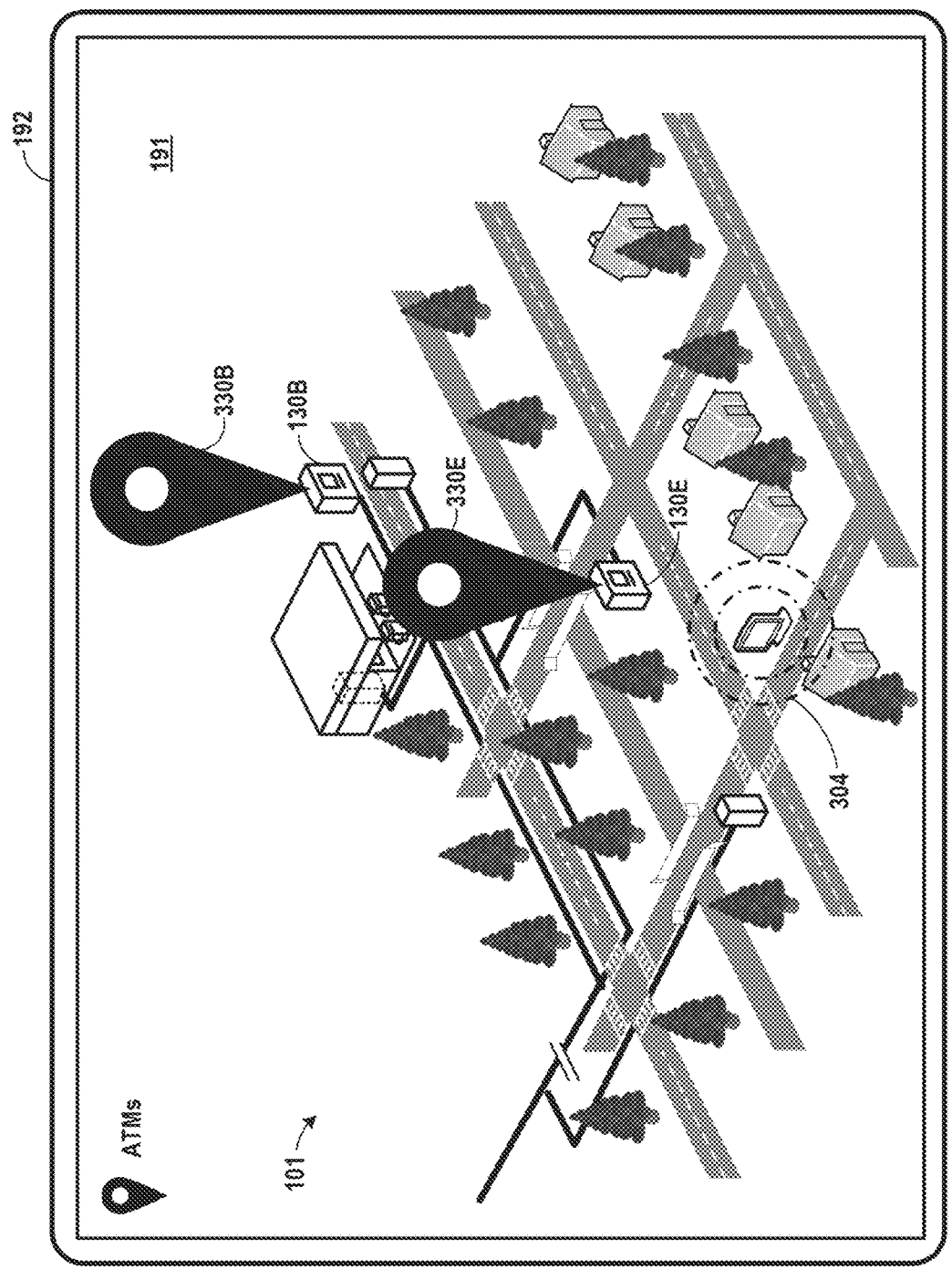
FIG. 3A and FIG. 3B are conceptual diagrams illustrating example user interfaces presented by a user interface device in accordance with one or more aspects of the present disclosure.
Figure 3B:
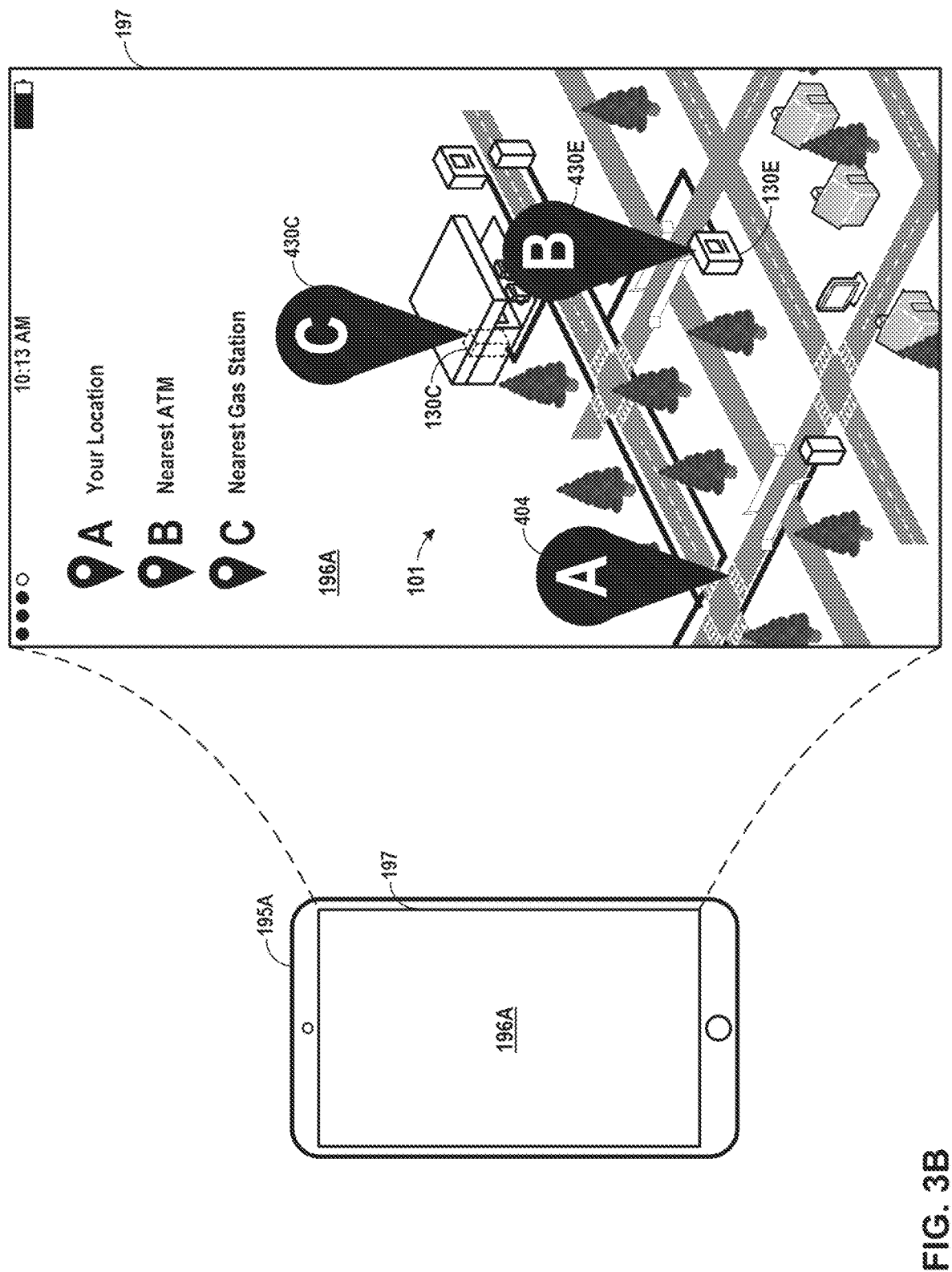

FIG. 3A and FIG. 3B are conceptual diagrams illustrating example user interfaces presented by a user interface device (e.g., display screen 192) in accordance with one or more aspects of the present disclosure. One or more aspects of the user interfaces illustrated in FIG. 3A and FIG. 3B may be described herein within the context of FIG. 1 and FIG. 2.

User interface 191, illustrated in FIG. 3A, may correspond to a user interface presented by public display system 190 of FIG. 1 and/or FIG. 2. In some examples, user interface 191 may include data or instructions used by a computing device to present a visual image on a physical display screen 192 (e.g., associated public display system 190) in a disaster relief tent or in a public location that is likely to be seen by users having an interest in or a need for information about the operation and/or current status of one or more financial service systems 130 within affected area 101. User interface 191 may therefore be presented at display screen 192 as a source of public information, located within affected area 101, and serving to provide information to users that might not otherwise have an ability to obtain the information included within user interface 191.

User interface 196A, illustrated in FIG. 3B, may correspond to a user interface presented by mobile device 195A of FIG. 1 and/or FIG. 2. User interface 196A may be presented as an individualized user interface presented by a user's mobile device, and serving to provide individualized information to a user having a mobile device. Similar user interfaces may be presented by other mobile devices 195.

Although the user interfaces illustrated in FIG. 3A and FIG. 3B are shown as graphical user interfaces, other types of user interfaces may be presented by public display system 190 and/or mobile devices 195, including a text-based user interface, a console or command-based user interface, a voice prompt user interface, or any other appropriate user interface.

FIG. 3A illustrates an example user interface that may be presented by public display system 190 as a result of receiving information about capabilities of financial service systems 130 within affected area 101. For instance, with reference to an example that can be described in the context of FIG. 2, communication module 124 of drone 110 causes communication units 115 to output one or more signals over drone-enabled network 106. Public display system 190 detects a signal over drone-enabled network 106 and determines that the signal includes information sufficient to generate a user interface. Public display system 190 generates user interface 191 and presents it within display screen 192 of public display system 190 as illustrated in FIG. 3A.

In FIG. 3A, user interface 191 illustrates a map of affected area 101, and shows locations of interest on the map. The locations may be presented relative to location 304, which corresponds the position of public display system 190 within the map of affected area 101. User interface 191 may include various location pins highlighting one or more types of financial infrastructure systems and/or financial service systems 130. In the example shown, ATM location pin 330B identifies the location of financial service system 130B within the map. ATM location pin 330E identifies the location of financial service system 130E within the map. In other examples, one or more location pins or other indicia may additionally, or alternatively, highlight other types of financial service systems 130, such as point of sale terminals, gas or recharging stations, grocery stores, medical facilities, and the like. Further, user interface 191 may identify which financial service systems 130 or ATMs are functional and capable of providing financial services. Public display system 190 may present and continue to update information in near and/or seemingly-near real time so that, for example, information about availability is changed, user interface 191 is updated accordingly.

FIG. 3B illustrates an example user interface that may be presented by mobile device 195A as a result of receiving information about capabilities of financial service systems 130 within affected area 101. For instance, again with reference to FIG. 2, communication module 124 of drone 110 causes communication units 115 to output one or more signals over drone-enabled network 106. One or more of mobile devices 195 detect a signal over drone-enabled network 106 and determine that the signal includes information sufficient to generate a user interface. Mobile device 195A, for example, receives such information, generates user interface 196A, and presents user interface 196A within mobile display screen 197 of mobile device 195A in the manner illustrated in FIG. 3B.

Figure 4:
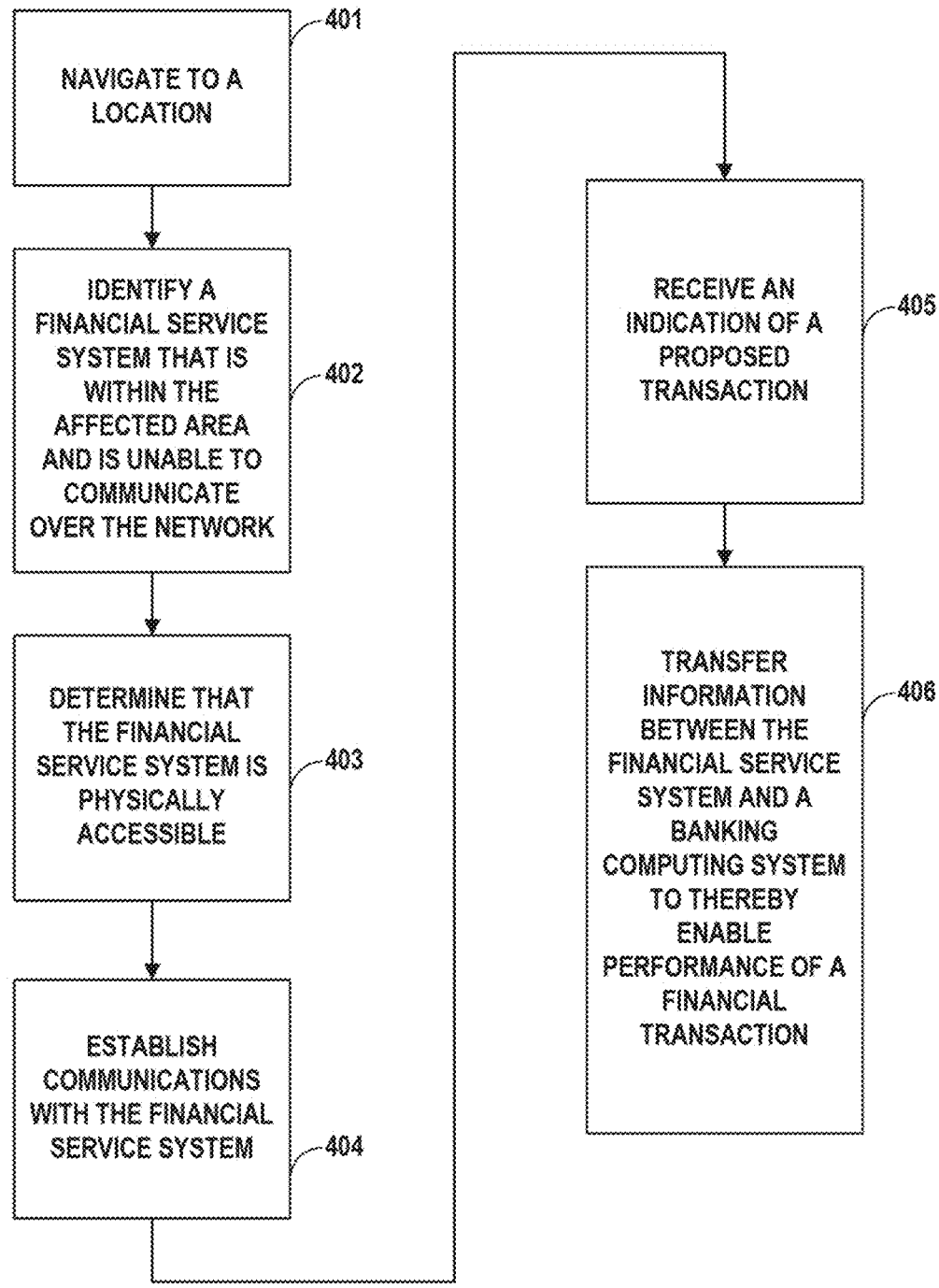
FIG. 4 is a flow diagram illustrating operations performed by an example drone in accordance with one or more aspects of the present disclosure.

In FIG. 3B, user interface 196A illustrates a map of affected area 101 from the perspective of a user of mobile device 195A. User interface 196A shows locations of interest on the map, relative to the current location of mobile device 195A, which mobile device 195A has determined based on detected geolocation information. In the example of FIG. 3B, the nearest operable ATM machine is financial service system 130E, and the nearest operable point of sale device at which fuel can be purchased is financial service system 130C. Current location pin 404 of user interface 196A identifies the location of mobile device 195A within the map. Location pin 430E of user interface 196A identifies the nearest operable automated teller machine, corresponding to financial service system 130E. Location pin 430C of user interface 196A identifies the nearest operable point of sale terminal within affected area 101 for purchasing fuel, corresponding to financial service system 130C. In this example, any inoperable financial service systems are not highlighted. In other examples, inoperable systems 130 might be highlighted by a different location pin or in another way. Further, in other examples, one or more location pins or other indicia may additionally, or alternatively, highlight other types of financial service systems 130 or other items of interest. Such items of interest may include, for example, the nearest grocery store and/or medical facility. User interface 196A may identify which financial service systems 130 or ATMs are functional and capable of providing financial services. Mobile device 195A may present and continue to update information in near and/or seemingly-near real time so that, for example, information about availability is changed, user interface 196A is updated accordingly FIG. 4 is a flow diagram illustrating operations performed by an example drone in accordance with one or more aspects of the present disclosure. FIG. 4 is described below within the context of drone 110 of FIG. 2. In other examples, operations described in FIG. 4 may be performed by one or more other components, modules, systems, or devices. Further, in other examples, operations described in connection with FIG. 4 may be merged, performed in a difference sequence, or omitted.

In the example of FIG. 4, and in accordance with one or more aspects of the present disclosure, drone 110 may navigate to a location near an area in which one or more financial service systems are unable to communicate over a network (401). For instance, in some examples, analysis module 126 outputs to navigation module 122 information about an outage within affected area 101. Navigation module 122 causes navigation unit 116 to navigate drone 110 to the vicinity of affected area 101. One or more sensors 119 detect input about the location of drone 110 when drone 110 is near affected area 101. Sensors 119 output to navigation module 122 an indication of input. Navigation module 122 determines that the input corresponds to an indication that drone 110 is at or near affected area 101. Navigation module 122 causes drone 110 to hover over affected area 101.

Drone 110 may identify, based on a wireless signal detected by the vehicle, a financial service system that is within the area and is able to communicate with the drone (402). For instance, in some examples, communication module 124 of drone 110 causes communication units 115 to output a signal over drone-enabled network 106. Communication units 135 of financial service system 130B detect a signal over drone-enabled network 106 and outputs to recovery module 152 an indication of a signal. Recovery module 152 determines, based on the indication of the signal, that the signal corresponds to a request for information about the condition and/or capabilities of financial service system 130B. Recovery module 152 determines information about its capabilities and condition. Recovery module 152 causes communication units 135 to output a signal over drone-enabled network 106. Communication units 115 of drone 110 detect a signal and outputs to communication module 124 an indication of the signal. Communication module 124 outputs to analysis module 126 information about the signal. Analysis module 126 determines that the signal indicates that financial service system 130B is unable to access bank computing system 108 over network 105, but is otherwise capable of performing the functions of an ATM.

Drone 110 may determine that the operable financial service system is physically accessible (403). For instance, in some examples, recovery module 152 causes camera 118 to capture one or more images of financial service system 130B. Analysis module 126 of drone 110 analyzes the images, and determines that financial service system 130B is physically accessible.

Drone 110 may establish communications with the financial service system (404). For instance, in some examples, communication module 124 of drone 110 communicates with communication units 115 of financial service system 130B to establish a secure communications channel over drone-enabled network 106.

Drone 110 may receive an indication of a proposed transaction (405). For instance, in some examples, communication units 115 of drone 110 detect input and outputs to communication module 124 an indication of input. Communication module 124 outputs to analysis module 126 information about the input. Analysis module 126 determines that the input corresponds to a proposed transaction (e. g., an ATM withdrawal). In a different example, communication units 115 of drone 110 detect input and outputs to communication module 124 an indication of input. Communication module 124 sends, over network 105, a corresponding signal to bank computing system 108. Bank computing system 108 receives a signal and determines that the signal corresponds to a proposed transaction (e.g., an ATM withdrawal).

Drone 110 may transfer information between the financial service system and a banking computing system to thereby enable performance of the proposed financial transaction (406). For instance, in some examples, while a transaction is being performed at financial service system 130B, communication units 115 may detect input from financial service system 130B over drone-enabled network 106 and output to communication module 124 indications of input. In response, communication module 124 may cause communication units 115 to send corresponding signals over network 105 to bank computing system 108. Also, while the transaction is being performed at financial service system 130B, communication units 115 may detect input over network 105 from bank computing system 108 and output to communication module 124 indications of input. In response, communication module 124 may cause communication units 115 to send corresponding signals over drone-enabled network 106 to financial service system 130B. As a result of transferring information between bank computing system 108 and financial service system 130B, the financial transaction is performed.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other generally or functionally equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a mobile or non-mobile computing device, a wearable or non-wearable computing device, and/or an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
   navigating an unmanned drone, by a computing system of the drone, to an area in which one or more financial service systems have been disconnected from a network;
   identifying, by the computing system of the drone and based on a wireless signal detected by the drone, a financial service system that is within the area and is capable of communicating with the drone but is not capable of communicating over the network, wherein the financial service system is one of the one or more financial service systems;
   establishing, by the computing system of the drone, communications with the financial service system over a wireless network established by the drone;
   sending a signal, by the computing system of the drone and to the financial service system, to engage a recovery module included within the financial service system to perform diagnostics to determine diagnostic information, wherein the diagnostic information includes information about undamaged capabilities of the financial service system and an image of physical surroundings of the financial service system that is captured by the recovery module;
   responsive to sending the signal, receiving, by the computing system of the drone, the diagnostic information;
   determining, by the computing system of the drone and based on the information about undamaged capabilities of the financial service system, that the financial service system is physically accessible and capable of performing financial transactions; and
   transferring, by the computing system of the drone, information between the financial service system and a banking computing system to enable completion of a financial transaction initiated at the financial service system.

2. The method of claim 1, wherein the financial service system is an automated teller machine, wherein the banking computing system is a remote banking system computing system, wherein the financial transaction is a cash withdrawal, and wherein transferring information includes:
   receiving, from the automated teller machine, a request to withdraw a specified amount of cash;
   sending, to the remote banking system, a signal derived from the request to withdraw the specified amount of cash;
   receiving, from the remote banking system, an authorization to dispense the specified amount of cash; and
   sending, to the automated teller machine, a signal enabling the automated teller machine to dispense the specified amount of cash.

3. The method of claim 1, wherein determining that the financial service system is physically accessible comprises:
   determining, by the computing system of the drone, a location of the financial service system;
   capturing at least one image of the location, including an area surrounding the financial service system; and
   determining, based on the at least one image, that the financial service system is physically accessible.

4. The method of claim 1, wherein determining that the financial service system is physically accessible comprises:
   receiving at least one image of an area surrounding the financial service system;
   sending the at least one image to a remote server; and
   responsive to sending the at least one image, receiving an indication that the financial service system is physically accessible.

5. The method of claim 1, wherein the wireless signal is a responsive wireless signal, and wherein identifying the financial service system includes:
   outputting an exploration wireless signal; and
   responsive to outputting the exploration wireless signal, receiving the responsive wireless signal from the financial service system.

6. The method of claim 1, wherein establishing communications with the financial service system includes:
   serving as a gateway between the financial service system and the network.

7. The method of claim 1, wherein the financial service system includes at least one of an automated teller machine, a point-of-sale device, a fuel pump, and a financial services kiosk.

8. The method of claim 1, further comprising:
   determining, by the computing system of the drone, a location of the financial service system;
   collecting, by the computing system of the drone, information about services disrupted within the location, wherein collecting information about services disrupted within the location includes collecting at least one image of the location of the financial service system; and
   communicating, by the computing system of the drone and to service providers that serve the area, the collected information.

9. The method of claim 1, further comprising:
   establishing, by the computing system of the drone, communications with a user computing device within the area.

10. The method of claim 8, further comprising:
    sending, by the computing system of the drone and to the user computing device, information about the location of the financial service system.

11. The method of claim 9, wherein establishing communications with the user computing device includes:
    establishing reduced-scale services with the user computing device.

12. A computing system of a vehicle comprising:
    a storage device; and
    processing circuitry having access to the storage device and configured to:
    navigate the vehicle to an area in which one or more financial service systems have been disconnected from a network, identify, based on a wireless signal detected by the vehicle, a financial service system that is within the area and is capable of communicating with the vehicle but is not capable of communicating over the network, wherein the financial service system is one of the one or more financial service systems, establish communications with the financial service system over a wireless network established by the vehicle, send a signal to the financial service system to engage a recovery module included within the financial service system to perform diagnostics to determine diagnostic information, wherein the diagnostic information includes information about undamaged capabilities of the financial service system and an image of physical surroundings of the financial service system that is captured by the recovery module, receive the diagnostic information, determine, based on the information about undamaged capabilities of the financial service system, that the financial service system is physically accessible and capable of performing financial transactions, and transfer information between the financial service system and a banking computing system to enable completion of a financial transaction initiated at the financial service system.

13. The computing system of claim 12, wherein the financial service system is an automated teller machine, wherein the banking computing system is a remote banking system computing system, wherein the financial transaction is a cash withdrawal, and wherein to transfer information, the processing circuitry is further configured to:

receive, from the automated teller machine, a request to withdraw a specified amount of cash;

send, to the remote banking system, a signal derived from the request to withdraw the specified amount of cash;

receive, from the remote banking system, an authorization to dispense the specified amount of cash; and send, to the automated teller machine, a signal enabling the automated teller machine to dispense the specified amount of cash.

14. The computing system of claim 12, wherein to determine that the financial service system is physically accessible, the processing circuitry is further configured to:

determine a location of the financial service system;

capture at least one image of the location, including an area surrounding the financial service system; and determine, based on the at least one image, that the financial service system is physically accessible.

15. The computing system of claim 12, wherein to determine that the financial service system is physically accessible, the processing circuitry is further configured to:

receive at least one image of an area surrounding the financial service system;

send the at least one image to a remote server; and responsive to sending the at least one image, receive an indication that the financial service system is physically accessible.

16. The computing system of claim 12, wherein the vehicle is an unmanned drone, wherein the wireless signal is a responsive wireless signal, and wherein to identify the financial service system, the processing circuitry is further configured to:

output an exploration wireless signal; and responsive to outputting the exploration wireless signal, receive the responsive wireless signal from the financial service system.

17. The computing system of claim 12, wherein to establish communications with the financial service system, the processing circuitry is further configured to:

serve as a gateway between the financial service system and the network.

18. The computing system of claim 12, wherein the financial service system includes at least one of an automated teller machine, a point-of-sale device, a fuel pump, and a financial services kiosk.

19. A computer-readable storage medium comprising instructions that, when executed, configure processing circuitry of a computing system of a vehicle to:

navigate the vehicle to an area in which one or more financial service systems have been disconnected from a network;

identify, based on a wireless signal detected by the vehicle, a financial service system that is within the area and is capable of communicating with the vehicle but is not capable of communicating over the network, wherein the financial service system is one of the one or more financial service systems;

establish communications with the financial service system over a wireless network established by the vehicle;

send a signal to the financial service system to engage a recovery module included within the financial service system to perform diagnostics to determine diagnostic information, wherein the diagnostic information includes information about undamaged capabilities of the financial service system and an image of physical surroundings of the financial service system that is captured by the recovery module;

responsive to sending the signal, receive the diagnostic information;

determine, based on the information about undamaged capabilities of the financial service system, that the financial service system is physically accessible and capable of performing financial transactions; and transfer information between the financial service system and a banking computing system to enable completion of a financial transaction initiated at the financial service system.

20. The computer-readable storage medium of claim 19, wherein the financial service system is an automated teller machine, wherein the banking computing system is a remote banking system computing system, wherein the financial transaction is a cash withdrawal, and wherein the instructions that configure the processing circuitry to transfer information include instructions that, when executed, configure the processing circuitry to:

receive, from the automated teller machine, a request to withdraw a specified amount of cash;

send, to the remote banking system, a signal derived from the request to withdraw the specified amount of cash;

receive, from the remote banking system, an authorization to dispense the specified amount of cash; and send, to the automated teller machine, a signal enabling the automated teller machine to dispense the specified amount of cash.

21. The computer-readable storage medium of claim 19, wherein the instructions, when executed, further configure the processing circuitry to:

determine that the financial service system is physically accessible.

22. The computer-readable storage medium of claim 21, wherein the instructions that configure the processing circuitry to determine that the financial service system is physically accessible include instructions that, when executed, configure the processing circuitry to:
  determine a location of the financial service system;
  capture at least one image of the location, including an area surrounding the financial service system; and
  determine, based on the at least one image, that the financial service system is physically accessible.

\* \* \* \* \*